United States Patent
Mercer

[15] 3,654,723
[45] Apr. 11, 1972

[54] MOTORIZED FISHING LINE

[72] Inventor: Joe F. Mercer, 302 E. Wallace St., Gonzales, Tex. 78629

[22] Filed: Apr. 9, 1969

[21] Appl. No.: 814,691

[52] U.S. Cl. ............................43/26.1, 43/27.4, 43/44.84
[51] Int. Cl. .......................................................A01k 97/00
[58] Field of Search ....................43/26.1, 27.4, 6.5, 44.84

[56] References Cited

UNITED STATES PATENTS

| 1,619,512 | 3/1927 | Heckman | 43/27.4 X |
| 2,564,260 | 8/1951 | Houser | 43/27.4 X |
| 488,874 | 12/1892 | Deniston | 43/27.4 |
| 523,561 | 7/1894 | White | 43/27.4 |
| 1,768,981 | 7/1930 | Henrikson | 43/27.4 X |
| 2,033,701 | 3/1936 | Gibbs | 43/44.84 |

Primary Examiner—Samuel Koren
Assistant Examiner—Daniel J. Leach
Attorney—Willard J. Hodger, Jr.

[57] ABSTRACT

A motorized fishing line structure comprising a fishing line formed into a closed loop and passing around a pair of pulleys disposed in spaced-apart positions in a body of water. The line also passes around a third pulley on shore which has a motor connected thereto to rotate the line continuously around the pulleys. Fish hooks are secured to the line in spaced relationship so as to be movable therewith through the water.

2 Claims, 5 Drawing Figures

PATENTED APR 11 1972      3,654,723

INVENTOR.
JOE F. MERCER

MOTORIZED FISHING LINE

SUMMARY OF THE INVENTION

My line is to be used in any body of water which is too rough or otherwise unsuitable for use by fisherman. Several horizontal pulleys are disposed in spaced apart positions in the body of water. A line is wrapped thereabout and extends to a mechanism on shore which rotates the line in a closed loop. Fishhooks are secured to the line in spaced positions and are rotated therewith. Thus any fish caught by a hook will be automatically brought to land.

DETAILED DESCRIPTION OF PREFERRED EMBODIMENT

Figure 1:
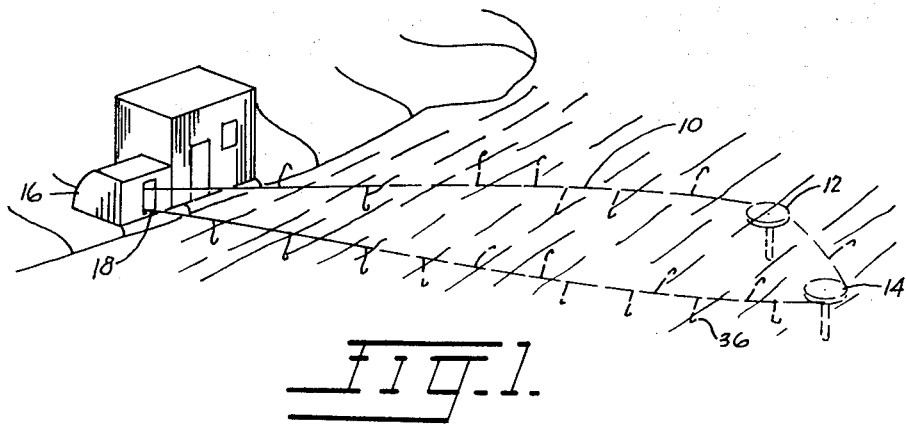
FIG. 1 is a perspective view of my invention in use.
Figure 2:
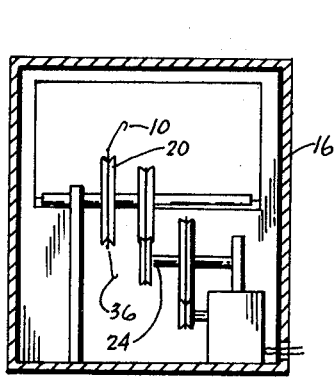
FIG. 2 is a cross section taken along line 2—2 in FIG. 3.
Figure 3:
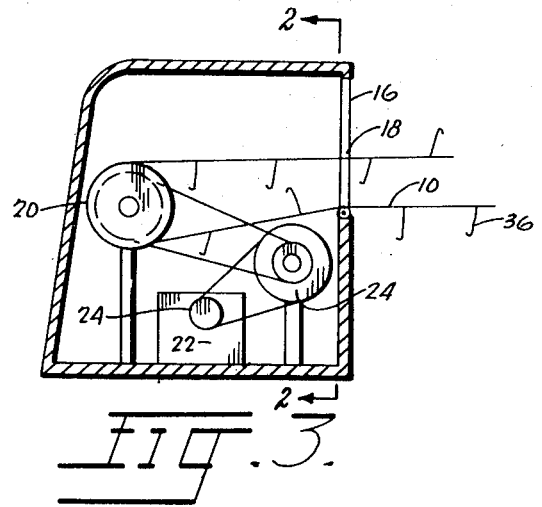
FIG. 3 is a side view of the line rotation mechanism.
Figures 4, 5:
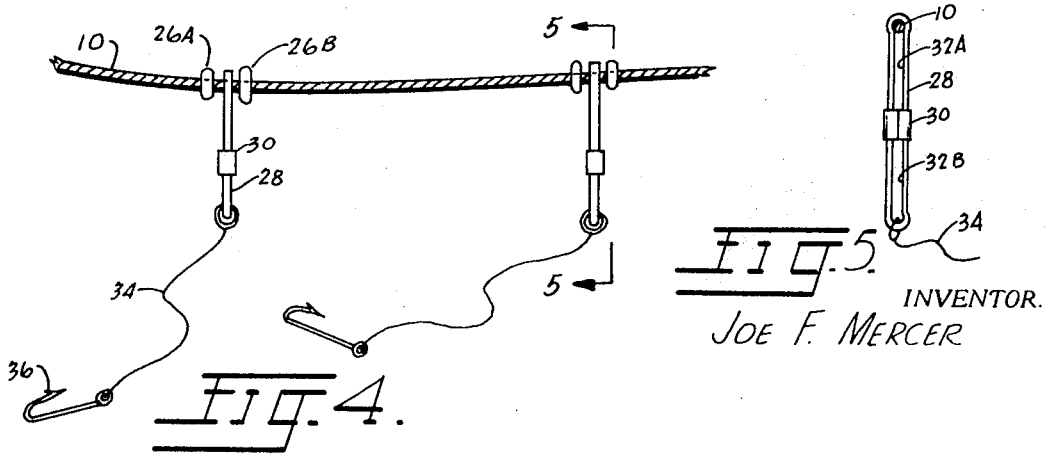
FIG. 4 is a detail view showing the connection of hooks to the line.
FIG. 5 is a cross section taken along line 5—5 in FIG. 4.

Referring now to FIGS. 1–5, a fishing line 10 is wrapped peripherally about portions of the outer surfaces of first and second horizontal pulleys 12 and 14 disposed in spaced-apart positions in a body of water and each freely rotatable about its own vertical axis.

Disposed on shore is a shed 16 having an opening 18 into which the line transferred from a horizontal plane to a vertical plane enters and engages vertical drive pulley 20. The line defines a closed loop.

An electric motor 22 is connected via a reducing gear mechanism 24 to pulley 20 to cause line 10 to be rotated continuously in a closed loop.

The line carries a plurality of groups of two closely spaced knots 26A and 26B. A vertically elongated member 28 has a central opening divided by clip 30 into an upper opening 32A through which the line extends and a lower opening 32B. A length of line 34 is secured at one end to the lower end of opening 32B and at the other end to a fishhook 36.

As the line rotates, the hooks are pulled through the water and any fish caught thereon will automatically be brought to shore.

While I have described my invention with particular reference to the drawings such is not to be considered as limiting its actual scope.

I claim:
1. A motorized fishing line structure comprising:
 a. a fishing line formed into a closed loop,
 b. a plurality of pairs of closely spaced knots or stops formed in or secured to said fishing line,
 c. a hook line secured to said fishing line between a multiplicity of said pairs of knots or stops,
 d. a vertical-drive pulley mounted for rotation and adapted to receive said fishing line formed in a closed loop,
 e. a shore base structure adapted to receive and secure said vertical drive pulley at a shore installation,
 f. a motor drive means mounted in conjunction with said shore base means constructed and arranged to drive in rotation said vertical drive pulley,
 g. at least one horizontal pulley remotely spaced from said vertical-drive pulley adapted to receive in rotation said fishing line and guide said line, and
 h. a thin elongated member pivotally mounted on said fishing line and intermediate said fishing line and said hook line pivotally securing said hook line to said fishing line.

2. A motorized fishing line structure comprising:
 a. a shore-based vertical drive pulley adapted to be driven in rotation constructed and arranged to receive and drive a fishing line,
 b. a horizontal off-shore pulley constructed and arranged to receive and rotatably retain a fishing line,
 c. a fishing line constructed in a closed loop mounted on said pulleys,
 d. a motorized means for powering said shore-based vertical pulley,
 e. a gear reduction means intermediate said vertical drive pulley and said motorized means adapted to drive in rotation said vertical drive pulley,
 f. a multiplicity of closely spaced pairs of knots or stops constructed in or secured to said fishing line,
 g. a vertical elongated member having an upper arcuate opening and a lower arcuate opening, said upper opening swivelly mounted on said fishing line intermediate said space pairs of knots or stops,
 h. a hook line secured to said lower arcuate opening, and
 i. a fish hook secured to said hook line.

* * * * *